United States Patent
Srivastava et al.

(10) Patent No.: US 11,820,302 B2
(45) Date of Patent: Nov. 21, 2023

(54) VEHICLE NOISE REDUCTION FOR VEHICLE OCCUPANTS

(71) Applicant: TOYOTA MOTOR ENGINEERING & MANUFACTURING NORTH AMERICA, INC., Plano, TX (US)

(72) Inventors: Abhishek Srivastava, Ann Arbor, MI (US); David W. Cosgrove, Milford, MI (US); Hidekazu Hirabayashi, Ann Arbor, MI (US); Akiyoshi Maeda, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 93 days.

(21) Appl. No.: 16/216,968

(22) Filed: Dec. 11, 2018

(65) Prior Publication Data
US 2020/0180600 A1 Jun. 11, 2020

(51) Int. Cl.
*B60W 20/17* (2016.01)
*B60W 10/30* (2006.01)
(Continued)

(52) U.S. Cl.
CPC ............ *B60R 16/03* (2013.01); *B60R 16/037* (2013.01); *B60W 10/30* (2013.01); *B60W 20/17* (2016.01);
(Continued)

(58) Field of Classification Search
CPC .. B60W 10/30; B60W 20/17; B60W 2520/10; B60W 2552/50; B60W 2554/20;
(Continued)

(56) References Cited

U.S. PATENT DOCUMENTS

| 5,142,824 A * | 9/1992 | Le Compagnon .... E05F 11/481 49/374 |
| 7,024,871 B2 * | 4/2006 | Zhu ........................ B60R 13/08 165/267 |

(Continued)

FOREIGN PATENT DOCUMENTS

| DE | 102005033353 A1 * | 1/2007 | ......... B60H 1/00764 |
| JP | 2006114869 | 4/2006 | |

(Continued)

OTHER PUBLICATIONS

Kuwabara, Takashi—English description of JP-2006347495-A via Espacenet Patent Translate, retrieved Aug. 30, 2021 (Year: 2021).*

(Continued)

*Primary Examiner* — Jeffrey C Boomer
*Assistant Examiner* — Paul Allen
(74) *Attorney, Agent, or Firm* — SHEPPARD, MULLIN, RICHTER & HAMPTON LLP; Hector A. Agdeppa; Daniel N. Yannuzzi

(57) ABSTRACT

A vehicle and method for vehicle noise reduction for vehicle occupants are provided. The method comprises detecting a position of a window of the vehicle; and controlling the duty of an operational component of the vehicle based on the position of the window of the vehicle and at least one of: a speed of the vehicle, and a presence of a sound-reflecting structure proximate to the vehicle; wherein the operational component is external to a cabin of the vehicle; and wherein noise generated by the operational component increases with a duty of the operational component.

17 Claims, 7 Drawing Sheets

(51) Int. Cl.
*B60R 16/03* (2006.01)
*B60R 16/037* (2006.01)
*F01P 7/04* (2006.01)
*F01P 7/16* (2006.01)
*F01P 7/12* (2006.01)
*B62D 5/06* (2006.01)

(52) U.S. Cl.
CPC ..... *B60W 2510/30* (2013.01); *B60W 2520/10* (2013.01); *B62D 5/062* (2013.01); *F01P 7/048* (2013.01); *F01P 7/12* (2013.01); *F01P 7/164* (2013.01)

(58) Field of Classification Search
CPC ...... B60W 2710/30–305; B60W 2510/30–305
USPC ..................................................... 701/36–49
See application file for complete search history.

(56) References Cited

U.S. PATENT DOCUMENTS

| | | | |
|---|---|---|---|
| 7,348,741 | B2 | 3/2008 | Minekawa |
| 8,378,804 | B2 | 2/2013 | Inoue |
| 2003/0185686 | A1* | 10/2003 | Stragapede ......... F16H 61/0025 417/44.11 |
| 2008/0113600 | A1 | 5/2008 | Kim |
| 2009/0025688 | A1* | 1/2009 | Asano ................. F02D 41/2438 123/478 |
| 2009/0069984 | A1* | 3/2009 | Turner .................... E05F 15/71 701/49 |
| 2010/0080399 | A1 | 4/2010 | Pfau |
| 2010/0082201 | A1* | 4/2010 | Pfau ................... B60H 1/00828 701/36 |
| 2010/0225264 | A1* | 9/2010 | Okuda ................. B60L 3/0046 318/473 |
| 2012/0291467 | A1* | 11/2012 | Sasaki ................... F25B 49/022 62/151 |
| 2013/0139532 | A1* | 6/2013 | Hashigaya ......... B60H 1/00428 62/134 |
| 2013/0160986 | A1* | 6/2013 | Hashigaya ......... B60H 1/00885 62/215 |
| 2013/0238220 | A1* | 9/2013 | Troebst .............. F02D 41/2422 701/102 |
| 2014/0120445 | A1* | 5/2014 | Mussro ............. H01M 8/04992 429/444 |
| 2014/0223943 | A1* | 8/2014 | Ichishi ................. B60H 1/3205 62/215 |
| 2014/0230466 | A1* | 8/2014 | Noll ...................... F04C 23/001 62/126 |
| 2014/0255122 | A1* | 9/2014 | Radosevic ........... G05D 16/163 137/225 |
| 2015/0025739 | A1* | 1/2015 | Wakairo .............. F16H 61/0025 701/36 |
| 2015/0239320 | A1* | 8/2015 | Eisenhour .......... B60H 1/00757 454/75 |
| 2016/0026879 | A1* | 1/2016 | Maeda ................. G06V 20/588 382/104 |
| 2016/0301115 | A1* | 10/2016 | Izumi ................... H01M 10/625 |
| 2016/0301116 | A1* | 10/2016 | Ochiai ............. H01M 10/6563 |
| 2016/0301119 | A1* | 10/2016 | Izumi .................... H01M 10/48 |
| 2017/0232950 | A1* | 8/2017 | Nishimine ............ B60W 20/00 701/22 |
| 2017/0305372 | A1* | 10/2017 | Adler ..................... B60T 13/662 |
| 2018/0001784 | A1* | 1/2018 | Porras ...................... F25B 5/02 |
| 2018/0105022 | A1* | 4/2018 | Jones ................... B60H 1/3205 |
| 2018/0170349 | A1* | 6/2018 | Jobson .................. B60W 20/11 |
| 2019/0061736 | A1* | 2/2019 | Wiesbeck ............. B60W 20/13 |
| 2019/0130887 | A1* | 5/2019 | Kotegawa .............. H04R 3/002 |
| 2019/0152298 | A1* | 5/2019 | Kurata .................... B60H 1/32 |

FOREIGN PATENT DOCUMENTS

| | | | | |
|---|---|---|---|---|
| JP | 2006347495 | A | * | 12/2006 |
| JP | 2007065122 | | | 3/2007 |
| JP | 2008155807 | A | * | 7/2008 |
| KR | 20050062051 | A | * | 6/2005 ............. F01P 11/12 |
| KR | 20160004429 | A | * | 1/2016 ........ B60H 1/00764 |

OTHER PUBLICATIONS

A. Radadi and F. Rehimi, "Implementation of a numerical tool for estimating the sound noise caused by road traffic in urban area," 2013 International Conference on Advanced Logistics and Transport, 2013, pp. 211-214, doi: 10.1109/ICAdLT.2013.6568461. (Year: 2013).*
Kim H—English Description of KR-20160004429-A via Espacenet Patent Translate, retrieved Mar. 16, 2022. (Year: 2022).*
Drees T—English Description of DE-102005033353-A1 via Espacenet Patent Translate, retrieved Mar. 16, 2022. (Year: 2022).*
Yoo Jin Young—English description of KR-20050062051-A via Espacenet Patent Translate, retrieved Aug. 9, 2022 (Year: 2022).*
Fujii S—English Translation of JP-2008155807-A via Espacenet Patent Translate, retrieved Jan. 25, 2023. (Year: 2023).*

* cited by examiner

VEHICLE NOISE REDUCTION FOR VEHICLE OCCUPANTS

TECHNICAL FIELD

The present disclosure relates generally to vehicles. In particular, embodiments of the present disclosure relate to reducing vehicle noise for occupants of the vehicle.

DESCRIPTION OF RELATED ART

People are quite sensitive to unwanted noise. In the field of vehicle design, great pains are taken to reduce the amount of unwanted noise in the vehicle cabin.

BRIEF SUMMARY OF THE DISCLOSURE

In general, one aspect disclosed features a vehicle comprising: an operational component external to a cabin of the vehicle, wherein noise generated by the operational component increases with a duty of the operational component; and a controller configured to control the duty of the operational component based on a position of a window of the vehicle and at least one of: a speed of the vehicle, and a presence of a sound-reflecting structure proximate to the vehicle.

Embodiments of the vehicle may include one or more of the following features. In some embodiments, the operational component includes a rotating component; the noise generated by the operational component increases with a speed of rotation of the rotating component; and the controller is further configured to control the speed of rotation of the rotating component based on the position of the window of the vehicle and at least one of: the speed of the vehicle, and the presence of the sound-reflecting structure proximate to the vehicle. Some embodiments comprise one or more sensors configured to detect the position of the window of the vehicle and at least one of: the speed of the vehicle, and the presence of the sound-reflecting structure proximate to the vehicle. In some embodiments, the controller is further configured to reduce the duty of the operational component responsive to: the window of the vehicle being open, and the speed of the vehicle being less than a speed threshold. Some embodiments comprise a memory configured to store a duty map; wherein the controller is further configured to reduce the duty of the operational component according to the duty map. In some embodiments, the controller is further configured to further reduce the duty of the operational component responsive to: the sound-reflecting structure being near the vehicle. In some embodiments, the rotating component comprises at least one of: an electric cooling fan; an electric compressor; an alternator; a power steering pump; and a water pump.

In general, one aspect disclosed features a method for a vehicle, the method comprising: detecting a position of a window of the vehicle; and controlling the duty of an operational component of the vehicle based on the position of the window of the vehicle and at least one of: a speed of the vehicle, and a presence of a sound-reflecting structure proximate to the vehicle; wherein the operational component is external to a cabin of the vehicle; and wherein noise generated by the operational component increases with a duty of the operational component.

Embodiments of the method may include one or more of the following features. In some embodiments, the operational component includes a rotating component; the noise generated by the operational component increases with a speed of rotation of the rotating component; and controlling the duty of the operational component comprises controlling the speed of rotation of the rotating component based on the position of the window of the vehicle and at least one of: the speed of the vehicle, and the presence of the sound-reflecting structure proximate to the vehicle. Some embodiments comprise detecting at least one of: the speed of the vehicle, and the presence of the sound-reflecting structure proximate to the vehicle. Some embodiments comprise reducing the duty of the operational component responsive to the window of the vehicle being open, and the speed of the vehicle being less than a speed threshold. Some embodiments comprise storing a duty map; and reducing the duty of the operational component according to the duty map. Some embodiments comprise further reducing the duty of the operational component responsive to the sound-reflecting structure being proximate to the vehicle. In some embodiments, the rotating component comprises at least one of: an electric cooling fan; an electric compressor; an alternator; a power steering pump; and a water pump.

In general, one aspect disclosed features non-transitory machine-readable storage medium encoded with instructions executable by a hardware processor of a computing component, the machine-readable storage medium comprising instructions to cause the hardware processor to perform a method for a vehicle, the method comprising: determining a position of a window of the vehicle; and controlling the duty of an operational component of the vehicle based on the position of the window of the vehicle and at least one of: a speed of the vehicle, and a presence of a sound-reflecting structure proximate to the vehicle; wherein the operational component is external to a cabin of the vehicle; and wherein noise generated by the operational component increases with a duty of the operational component.

Embodiments of the medium may include one or more of the following features. In some embodiments, the operational component includes a rotating component; the noise generated by the operational component increases with a speed of rotation of the rotating component; and controlling the duty of an operational component comprises controlling the speed of rotation of the rotating component based on the position of the window of the vehicle and at least one of: the speed of the vehicle, and the presence of the sound-reflecting structure proximate to the vehicle. In some embodiments the method further comprises detecting at least one of: the speed of the vehicle, and the presence of the sound-reflecting structure proximate to the vehicle. In some embodiments the method further comprises reducing the duty of the operational component responsive to the window of the vehicle being open, and the speed of the vehicle being less than a speed threshold. In some embodiments the method further comprises storing a duty map; and reducing the duty of the operational component according to the duty map. In some embodiments the method further comprises further reducing the duty of the operational component responsive to the sound-reflecting structure being proximate to the vehicle.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
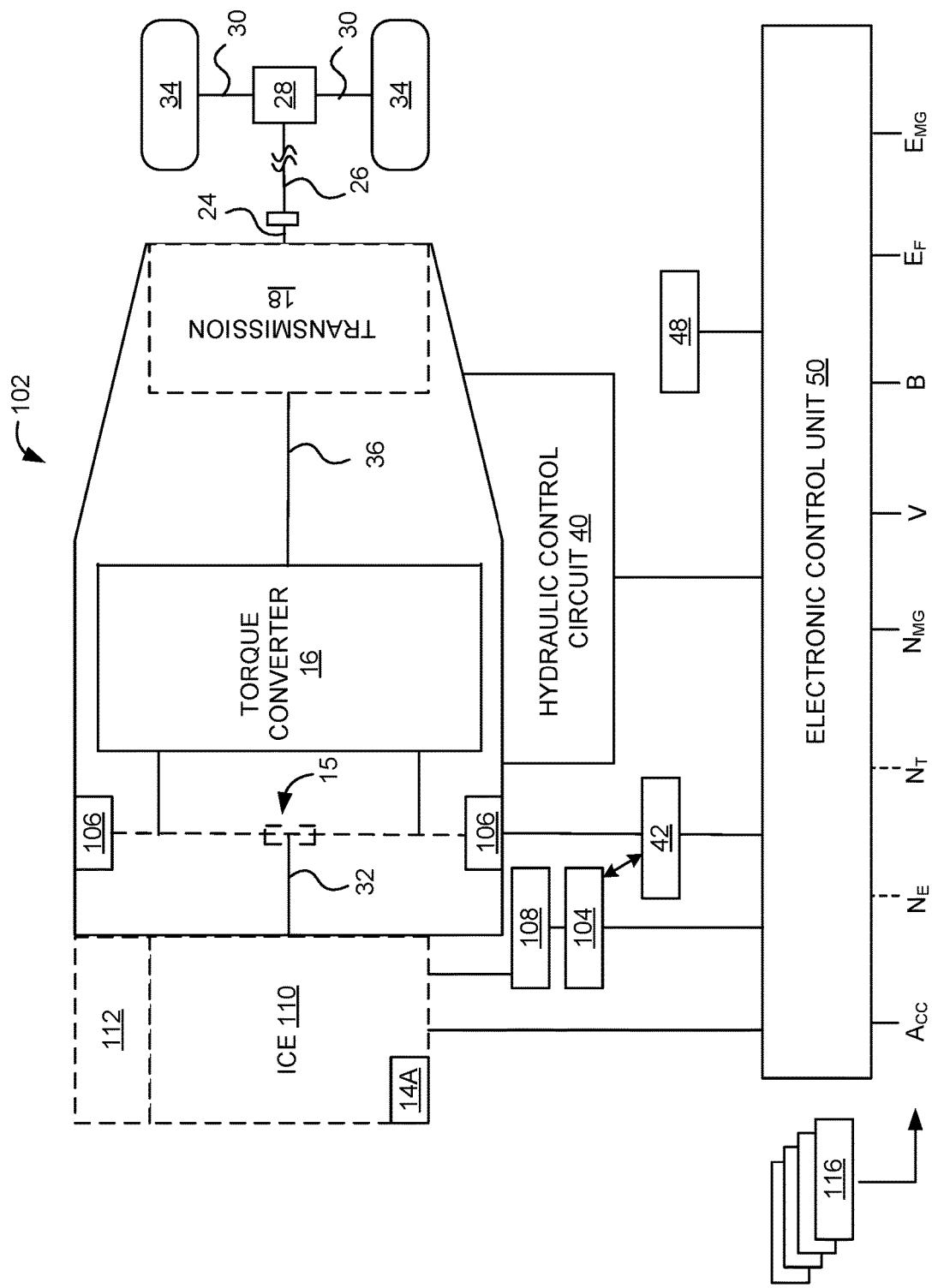
FIG. 1 illustrates an example vehicle in which embodiments of the disclosed technology may be implemented.

The figures are not exhaustive and do not limit the present disclosure to the precise form disclosed.

DETAILED DESCRIPTION

Some operational components of modern vehicles generate considerable noise. These operational components may include, for example, an electric cooling fans, electric compressors, alternators, power steering pumps, water pumps, and the like. Under certain conditions this noise may enter the vehicle cabin. Elevated noise levels in the vehicle cabin may prevent conversation or enjoyment of music, inhibit a driver's concentration, or even cause hearing damage.

Certain conditions may affect the level of operational component noise in the cabin. For example, when one or more windows of the vehicle are open, more noise will enter the vehicle cabin than when all of the windows are closed. This effect is exacerbated by the presence of sound-reflecting structures, for example when the vehicle is in a drive-thru, alley, or the like. However, when the vehicle is operating at moderate or high speeds with a window open, wind noise will obscure the noise generated by the operational components of the vehicle.

Generally, the noise generated by an operational component increases with the duty of the component. For example, the noise generated by a rotating component generally increases with the rotational speed of the component. For clarity of description, various embodiments will be described in terms of the rotational speed of a rotating component. In particular, the rotational components will be described as a fan and compressor that form part of the engine cooling system of a vehicle. However, it should be understood that the disclosed technology applies to other vehicle systems, rotating operational components, and non-rotating operational components.

Currently the rotational speed of a rotating operational component of a vehicle is set according to customer use, customer settings, and ambient conditions. For example, the rotational speeds of the cooling fan and compressor are set according to the engine temperature, the ambient temperature, and the like.

Various embodiments are directed to systems and methods that reduce the rotational speed of one or more operational components of a vehicle when a window of the vehicle is open, and the vehicle is operating at a low speed or stopped. Some embodiments may further reduce the rotational speed when a noise-reflecting structure is nearby. The vehicle may include sensors to detect the speed of the vehicle, the position of the windows, the presence of noise-reflecting structures, and the like. The rotational speeds of the operational components may be reduced to a fixed level, or may be reduced according to one or more duty maps that provide the desired rotational speed as a function of an operating parameter such as engine temperature or the like.

One benefit of the disclosed technology is the reduction of noise for the occupants of the vehicle. This reduction allows for improved noise, vibration, and harshness (NVH) performance, for example when the cooling load is low in the vehicle. This reduction also allows for higher performance of the components when noise is not a concern while still maintaining required NVH levels in worst case conditions.

An example vehicle 102 in which embodiments of the disclosed technology may be implemented is illustrated in FIG. 1. The vehicle depicted in FIG. 1 is a hybrid electric vehicle. However, the disclosed technology is independent of the means of propulsion of the vehicle, and so applies equally to vehicles without an electric motor, and to vehicles without an internal combustion engine.

FIG. 1 illustrates a drive system of a vehicle 102 that may include an internal combustion engine 110 and one or more electric motors 106 (which may also serve as generators) as sources of motive power. Driving force generated by the internal combustion engine 110 and motor 106 can be transmitted to one or more wheels 34 via a torque converter 16, a transmission 18, a differential gear device 28, and a pair of axles 30.

As an HEV, vehicle 102 may be driven/powered with either or both of engine 110 and the motor(s) 106 as the drive source for travel. For example, a first travel mode may be an engine-only travel mode that only uses internal combustion engine 110 as the drive source for travel. A second travel mode may be an EV travel mode that only uses the motor(s) 106 as the drive source for travel. A third travel mode may be an HEV travel mode that uses engine 110 and the motor(s) 106 as drive sources for travel. In the engine-only and HEV travel modes, vehicle 102 relies on the motive force generated at least by internal combustion engine 110, and a clutch 15 may be included to engage engine 110. In the EV travel mode, vehicle 102 is powered by the motive force generated by motor 106 while engine 110 may be stopped and clutch 15 disengaged.

Engine 110 can be an internal combustion engine such as a spark ignition (SI) engine (e.g., gasoline engine) a compression ignition (CI) engine (e.g., diesel engine) or similarly powered engine (whether reciprocating, rotary, continuous combustion or otherwise) in which fuel is injected into and combusted to provide motive power. A cooling system 112 can be provided to cool the engine such as, for example, by removing excess heat from engine 110. For example, cooling system 112 can be implemented to include a radiator, a water pump and a series of cooling channels. In operation, the water pump circulates coolant through the engine to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 110. In other applications, either or both the water pump and the fan may be operated by electric current such as from battery 104.

An output control circuit 14A may be provided to control drive (output torque) of engine 110. Output control circuit 14A may include a throttle actuator to control an electronic throttle valve that controls fuel injection, an ignition device that controls ignition timing, and the like. Output control circuit 14A may execute output control of engine 110 according to a command control signal(s) supplied from an electronic control unit 50, described below. Such output control can include, for example, throttle control, fuel injection control, and ignition timing control.

Motor 106 can also be used to provide motive power in vehicle 102, and is powered electrically via a battery 104. Battery 104 may be implemented as one or more batteries or other power storage devices including, for example, lead-acid batteries, lithium ion batteries, capacitive storage devices, and so on. Battery 104 may be charged by a battery charger 108 that receives energy from internal combustion engine 110. For example, an alternator or generator may be coupled directly or indirectly to a drive shaft of internal combustion engine 110 to generate an electrical current as a result of the operation of internal combustion engine 110. A clutch can be included to engage/disengage the battery charger 108. Battery 104 may also be charged by motor 106 such as, for example, by regenerative braking or by coasting during which time motor 106 operate as generator.

Motor 106 can be powered by battery 104 to generate a motive force to move the vehicle and adjust vehicle speed. Motor 106 can also function as a generator to generate electrical power such as, for example, when coasting or braking. Battery 104 may also be used to power other electrical or electronic systems in the vehicle. Motor 106 may be connected to battery 104 via an inverter 42. Battery 104 can include, for example, one or more batteries, capacitive storage units, or other storage reservoirs suitable for storing electrical energy that can be used to power motor 106. When battery 104 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 106, and adjust the current received from motor 106 during regenerative coasting and breaking. As a more particular example, output torque of the motor 106 can be increased or decreased by electronic control unit 50 through the inverter 42.

A torque converter 16 can be included to control the application of power from engine 110 and motor 106 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 110 from the drivetrain of the vehicle. In the illustrated example, a crankshaft 32, which is an output member of engine 110, may be selectively coupled to the motor 106 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 110 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 110 (engine RPM), a rotational speed, $N_{MG}$, of the motor 106 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 104 detected by an SOC sensor). Accordingly, vehicle 102 can include a plurality of sensors 116 that can be used to detect various conditions internal or external to the vehicle and provide sensed conditions to electronic control unit 50 (which, again, may be implemented as one or a plurality of individual control circuits). In one embodiment, sensors 116 may be included to detect one or more conditions directly or indirectly such as, for example, fuel efficiency, $E_F$, motor efficiency, $E_{MG}$, hybrid (internal combustion engine 110+MG 12) efficiency, etc.

In some embodiments, one or more of the sensors 116 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 116 may provide an analog output or a digital output.

Sensors 116 may be included to detect not only vehicle conditions but also to detect external conditions as well. Sensors that might be used to detect external conditions can include, for example, sonar, radar, lidar or other vehicle proximity sensors, and cameras or other image sensors.

Image sensors can be used to detect, for example, traffic signs indicating a current speed limit, road curvature, obstacles, the presence or absence of a road shoulder and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Figure 2:
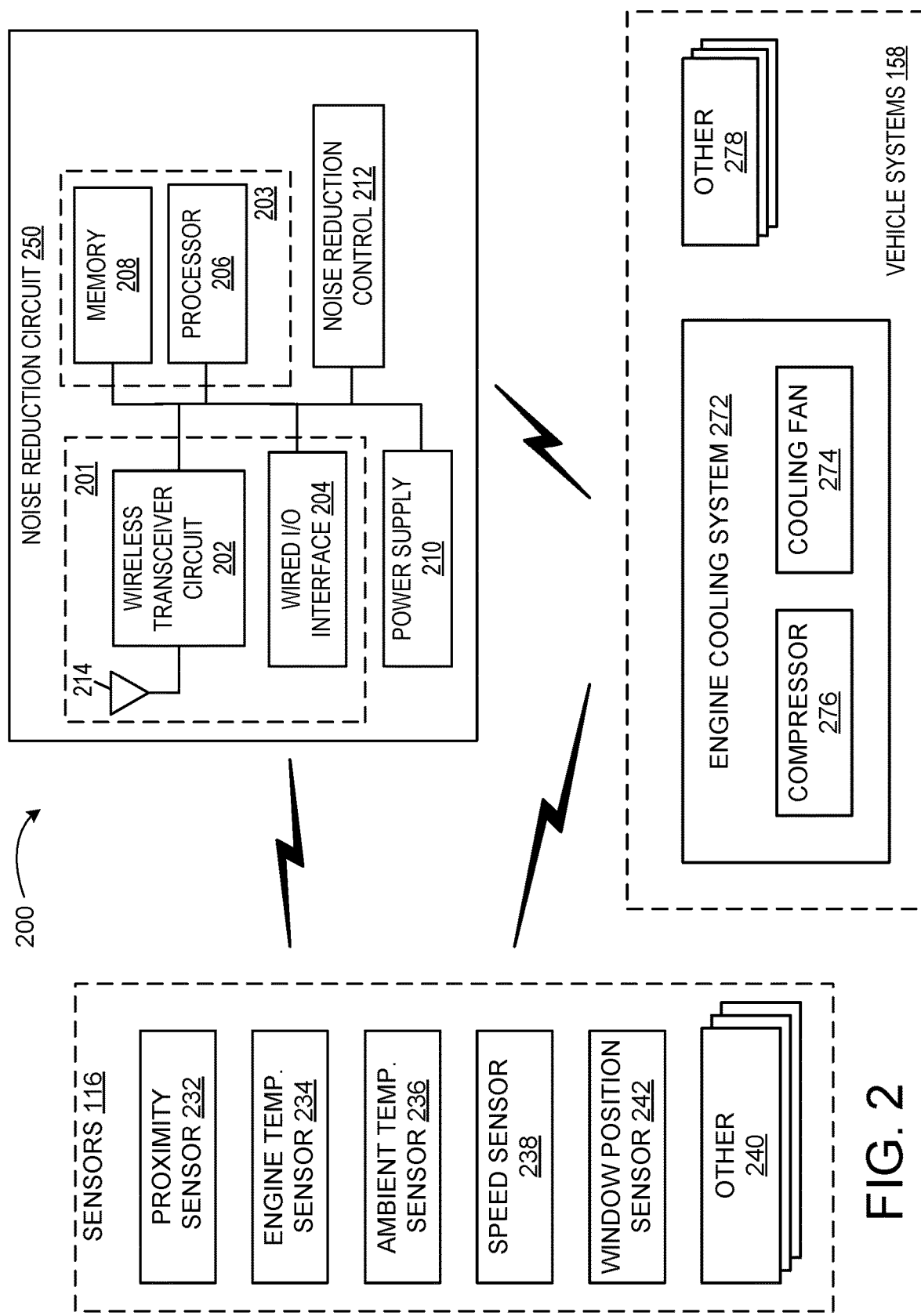
FIG. 2 illustrates an example architecture for vehicle cabin noise reduction in accordance with one embodiment of the systems and methods described herein.

FIG. 2 illustrates an example architecture for vehicle cabin noise reduction in accordance with one embodiment of the systems and methods described herein. Referring now to FIG. 2, in this example, a vehicle noise reduction system 200 includes a noise reduction circuit 250, a plurality of sensors 116, and a plurality of vehicle systems 158. Sensors 116 and vehicle systems 158 can communicate with noise reduction circuit 250 via a wired or wireless communication interface. Although sensors 116 and vehicle systems 158 are depicted as communicating with noise reduction circuit 250, they can also communicate with each other as well as with other vehicle systems. Noise reduction circuit 250 can be implemented as an ECU or as part of an ECU such as, for example electronic control unit 50. In other embodiments, noise reduction circuit 250 can be implemented independently of the ECU.

Noise reduction circuit 250 in this example includes a communication circuit 201, a processing circuit 203 (including a processor 206 and memory 208 in this example), noise reduction control 212, and a power supply 210. The memory 208 may store code executable by the processor 206. Components of noise reduction circuit 250 are illustrated as communicating with each other via a data bus, although other communication interfaces can be included. The noise reduction control 212 can be operated by the user to control the noise reduction circuit 250, for example by manual controls, voice, and the like.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory, and may be configured to store data and other information as well as operational instructions that may be used by the processor 206 to noise reduction circuit 250.

Although the example of FIG. 2 is illustrated using processor and memory circuitry, as described below with reference to circuits disclosed herein, processing circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a noise reduction circuit 250.

Communication circuit 201 includes either or both a wireless transceiver circuit 202 with an associated antenna 214 and a wired I/O interface 204 with an associated hardwired data port (not illustrated). As this example illustrates, communications between sensors 116/vehicle systems 158 and noise reduction circuit 250 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by noise reduction circuit 250 to/from other entities such as sensors 116 and vehicle systems 158.

Wired I/O interface 204 can include a transmitter and a receiver (not shown) for hardwired communications with other devices. For example, wired I/O interface 204 can provide a hardwired interface to other components, including sensors 116. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, NiH$_2$, rechargeable, primary battery, etc.), a power connector (e.g., to connect to vehicle supplied power, etc.), an energy harvester (e.g., solar cells, piezoelectric system, etc.), or include any other suitable power supply.

Sensors 116 may include additional sensors that may not otherwise be included on a standard vehicle 102 with which the noise reduction system 200 is implemented. In the illustrated example, sensors 116 include a proximity sensor 232, and engine temperature sensor 234, and ambient temperature sensor 236, a speed sensor 238, and a window position sensor 242. The sensors 116 may include any sensor capable of performing the functions described herein. Additional sensors 240 can also be included as may be appropriate for a given implementation of noise reduction system 200.

Vehicle systems 158 can include any of a number of different vehicle components or subsystems used to control or monitor various aspects of the vehicle and its performance. In this example, the vehicle systems 158 include an engine cooling system 272, as well as other vehicle systems 278. The engine cooling system 272 may include a cooling fan 274 and a compressor 276. The engine cooling system 272 operates to cool the internal combustion engine 110 of the vehicle 102, the one or more electric motors 106 of the vehicle 102, and the like. The inter-vehicle communications system 266 performs automatic vehicle-to-vehicle radio communications to exchange data as described herein, and may include a dedicated short-range communications (DSRC) device or the like.

During operation, noise reduction circuit 250 can receive information from various vehicle sensors to determine whether a noise reduction mode should be activated. Also, the driver may manually activate the noise reduction mode by operating noise reduction control 250. Communication circuit 201 can be used to transmit and receive information between noise reduction circuit 250, vehicle systems 158, and sensors 116. In various embodiments, communication circuit 201 can be configured to receive data and other information from sensors 116. Examples of this are described in more detail below.

Figure 3:
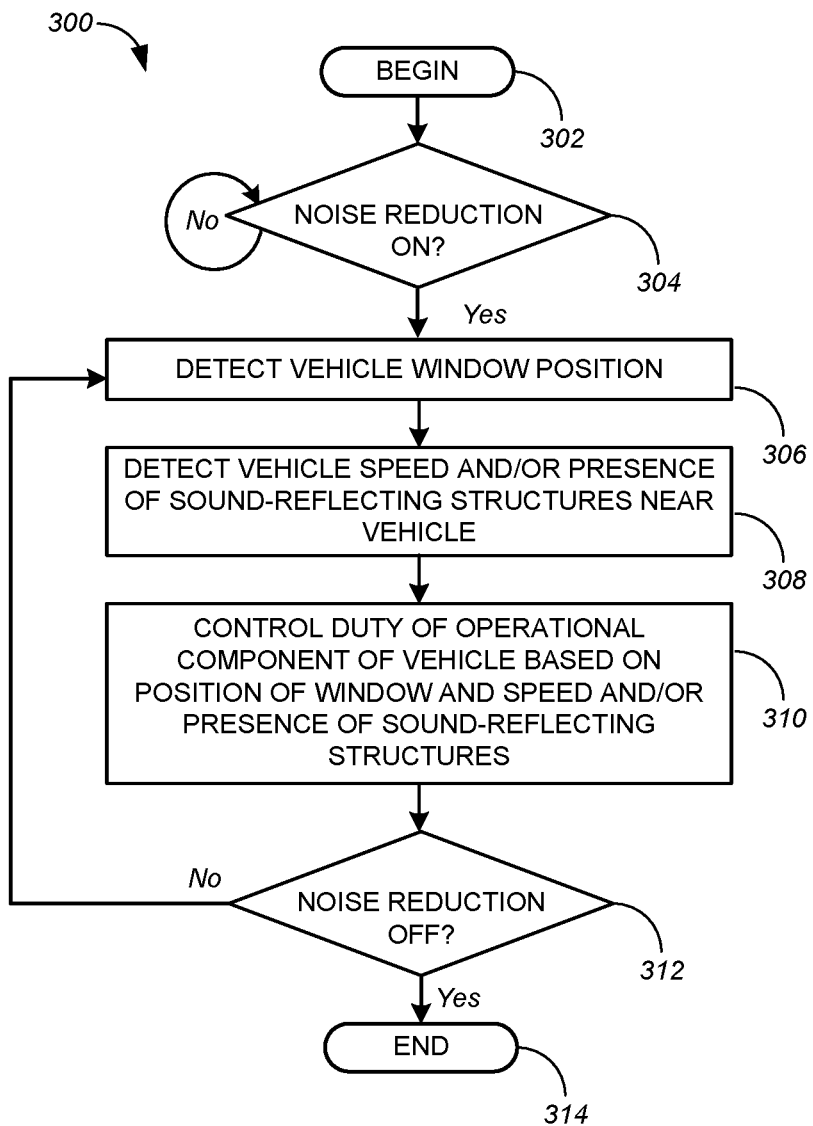
FIG. 3 is a flowchart illustrating a process for noise reduction according to one embodiment.

FIG. 3 is a flowchart illustrating a process 300 for noise reduction according to one embodiment. Referring to FIG. 3, the process 300 begins, at 302. The noise reduction circuit 250 first determines whether the noise reduction mode is on/active, at 304. This may include determining whether the noise reduction mode has been activated, for example, manually by the driver using the noise reduction control 212 to engage the noise reduction mode. The noise reduction circuit 250 continues this determination (periodically or aperiodically checking) until the noise reduction mode is activated. In other embodiments, the noise reduction circuit 250 operates whenever the vehicle 102 is on, and so the noise reduction control 212 is not used or needed.

Referring to FIG. 3, when the noise reduction mode is active, the noise reduction circuit 250 detects the positions of the windows of the vehicle 102, at 306. The window positions may be sensed by one or more of the window position sensors 242 of FIG. 2. Windows may include any windows in the vehicle 102, including not only windows on the sides the vehicle, but also other windows that may be opened such as rear windows, sunroofs, and the like.

Referring again to FIG. 3, the noise reduction circuit 250 detects the speed of the vehicle 102 and/or the presence of sound reflecting structures near the vehicle 102, at 308. The speed of the vehicle may be sensed by the speed sensor 238 of FIG. 2. The presence of sound reflecting structures near the vehicle 102 may be sensed by proximity sensor 232 of FIG. 2. To detect the presence of such sound reflecting structures, the proximity sensors 232 may include sensors such as radar, sonar, lidar, and the like. For example, a proximity sensor 232 may emit a pulse of energy, and may detect a reflection of that energy. Based on one or more characteristics of the reflected energy, for example such as direction and attenuation compared with the emitted pulse, the proximity sensor 232 may sense and/or indicate a presence of a sound-reflecting structure near the vehicle. In other embodiments, navigations systems may be used to detect these structures. For example, a mapping program may indicate the vehicle is located in an alley. The navigation system may also indicate the speed of the vehicle. In some embodiments, data fusion may be used to combine the data provided by the navigation system and the proximity sensors 232 to detect the structures.

Referring again to FIG. 3, the noise reduction circuit 250 controls the duty of an operational component of the vehicle 102 based on (i) the position of the vehicle windows and (ii) the vehicle speed and/or the presence of sound reflecting structures, at 310. As mentioned above, the operational component is external to a cabin of the vehicle, and the noise generated by the operational component increases with a duty of the operational component. And when a vehicle window is open, the noise generated by the operational component will be greater in the vehicle cabin when the vehicle windows are closed, and the vehicle is at a low speed or stopped such that wind noise does not obscure the noise generated by the operational component. As such, in some embodiments, the noise reduction circuit 250 controls the duty of the operational component by reducing the duty of the operational component responsive to the window of the vehicle being open, and the speed of the vehicle being less than a speed threshold.

Figure 4:
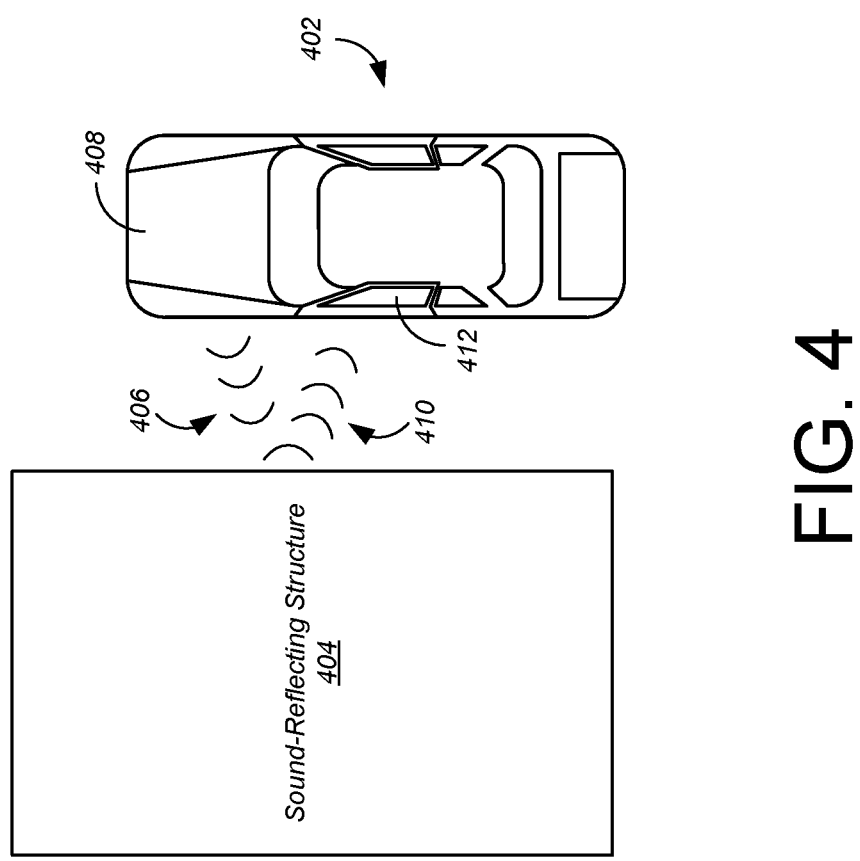
FIG. 4 illustrates how the problem of noise generated by the operational components of a vehicle is exacerbated when a sound reflecting structure is nearby.

Furthermore, this problem is exacerbated when a sound reflecting structure is nearby. FIG. 4 illustrates the problem. Referring to FIG. 4, a vehicle 402 is located proximate to a sound reflecting structure 404, for example such as a drive-thru restaurant. In this scenario, noise-generating operational components 408 are located at the front of the vehicle 402. However, the disclosed technology applies to any vehicle operational component external to the vehicle cabin. Noise 406 generated by operational components 408 is reflected by sound reflecting structure 404. When the window 412 of the vehicle 402 is open, the reflected noise 410 is easily admitted into the cabin of the vehicle 402. As such, in some embodiments, the noise reduction circuit 250 controls the duty of the operational component by reducing the duty of the operational component responsive to a sound-reflecting structure being near the vehicle.

In some embodiments, the operational component 408 includes a rotating component, and the noise generated by the operational component 408 increases with a speed of rotation of the rotating component. For example, the rotating component may be an electric cooling fan, an electric compressor, an alternator, a power steering pump, water pump, or the like. In such embodiments, the noise reduction circuit 250 controls the duty of the operational component by controlling a speed of rotation of the rotating component.

The noise reduction circuit 250 occasionally determines whether the noise reduction mode has been deactivated, at 312. While the noise reduction mode is active, the noise reduction circuit 250 continues to detect the positions of the windows of the vehicle, the vehicle speed, and/or the presence of sound reflecting structures near the vehicle, and to control the duty of operational components of the vehicle based on these parameters. When the noise reduction mode is deactivated, the process 300 ends, at 314.

Figure 5:
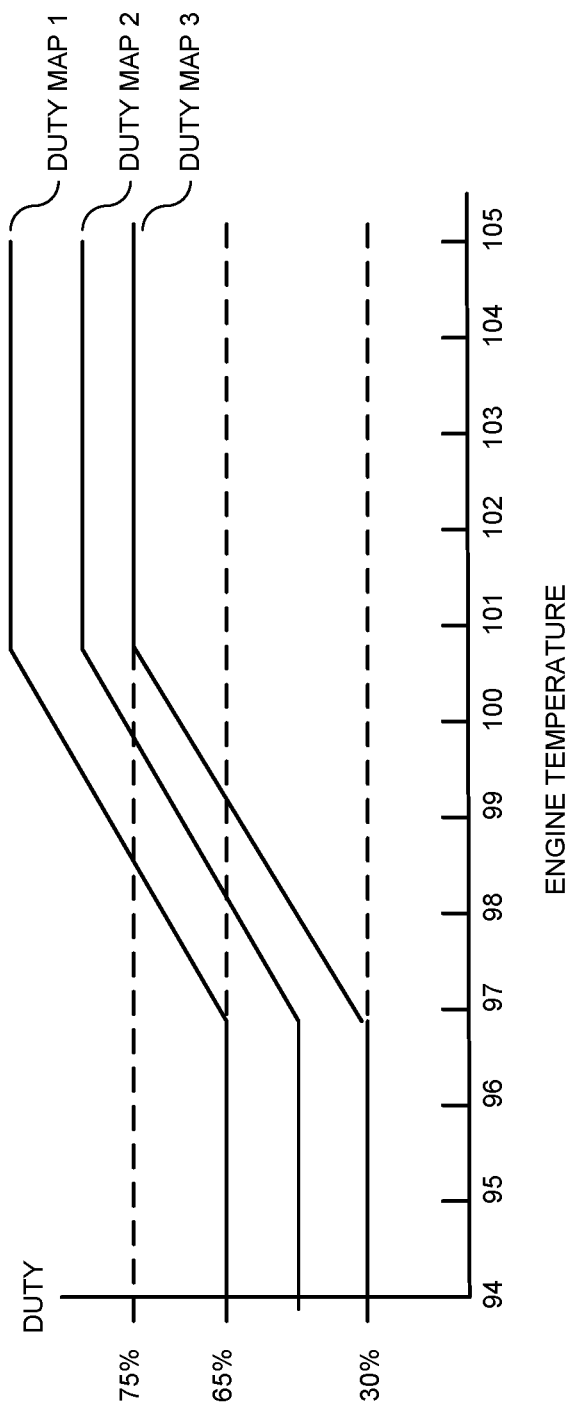
FIG. 5 illustrates three duty maps used to control the duty of operational components of the vehicle in one embodiment.

In some embodiments, the noise reduction circuit 250 controls the duty of operational components of the vehicle according to one or more duty maps. FIG. 5 illustrates an embodiment using three duty maps. Each duty map is represented by a curve on a plot of engine temperature versus duty, where duty is represented as a percentage of maximum duty. In other embodiments, parameters other than engine temperature may be used. In the depicted embodiment, each curve includes a high duty level connected by a ramp to a low duty level. For example, referring to FIG. 5, duty map 3 includes a 30% duty level ranging from 94° to 97°, a ramp from 97° to 101°, and a 75% duty level from 101° to 105°. However, other curves may be used.

Figure 6:
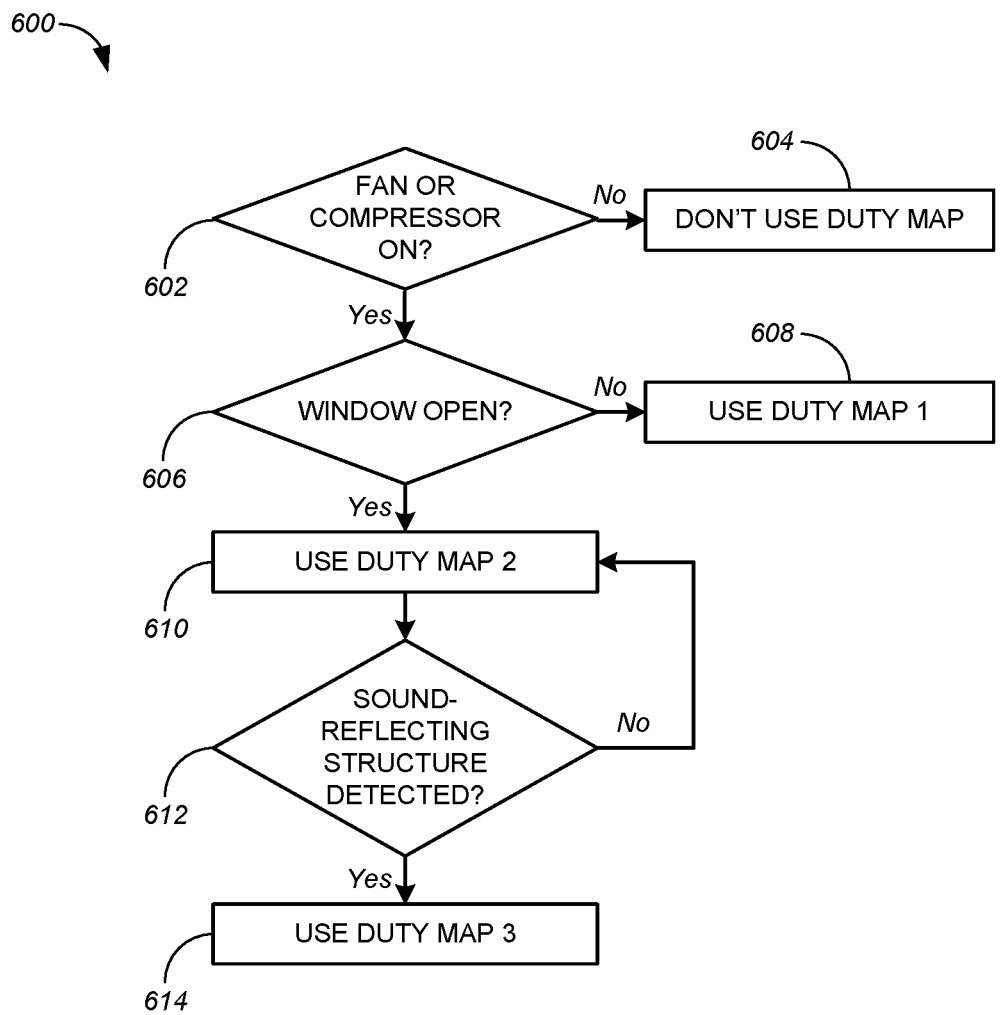
FIG. 6 is a flowchart illustrating a process for controlling the duty of an operational component of the vehicle using three duty maps according to one embodiment.

For example, the process 600 may use the duty maps of FIG. 5. FIG. 6 is a flowchart illustrating a process 600 for controlling the duty of an operational component of the vehicle using three duty maps according to one embodiment. In the described embodiment, the operational components are a fan and a compressor. However, the depicted process 600 may apply to any operational component of a vehicle that is external to the vehicle cabin. Referring to FIG. 6, if the fan or compressor is not on, at 602, then no duty map is used, at 604. That is, the fan and compressor are free to operate at any duty within their design limits. But if either the fan or the compressor is on, at 602, and a window is not open, at 606, then duty map 1 is used, at 608. Duty map 1 allows the fan and compressor to generate a substantial amount of noise, with the assumption that the closed windows will reject a large portion of the noise. If either the fan or the compressor is on, at 602, and a window is open, at 606, then duty map 2 is used, at 610. Duty map 2 reduces the amount of noise generated by the fan and compressor, with the assumption that the open windows will admit a substantial portion of the noise into the vehicle cabin. If either the fan or the compressor is on, at 602, a window is open, at 606, and a sound reflecting structure is detected near the vehicle, at 612, then duty map 3 is used, at 614. Duty map 3 reduces the amount of noise generated by the fan and compressor to a minimum level, but still within operational limits required to cool the engine, with the assumption that the noise admitted into the vehicle cabin by the open windows will be exacerbated by reflections from the sound-reflecting structure.

Figure 7:
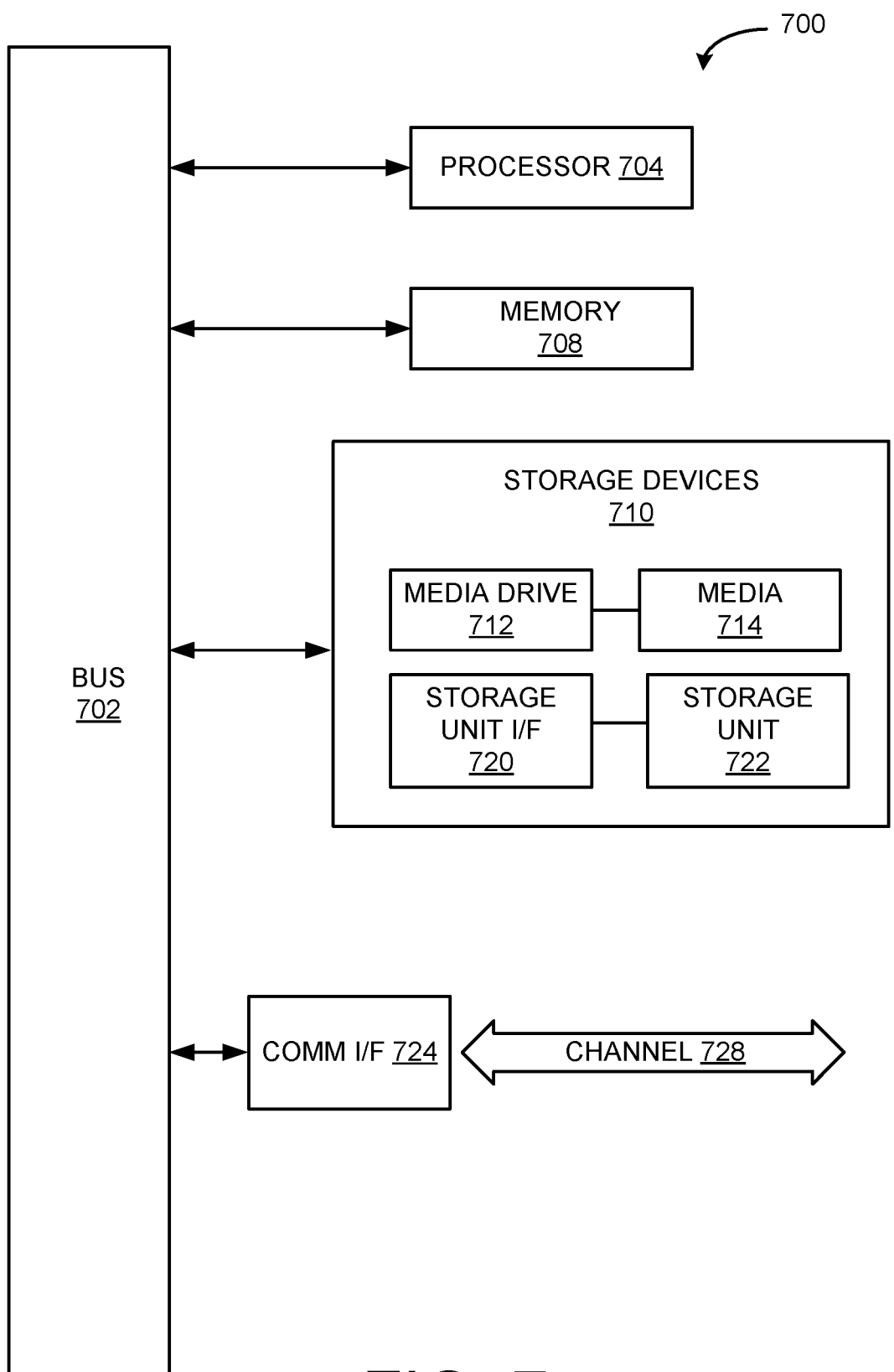
FIG. 7. shows an example computing component capable of carrying out the functionality described with respect thereto.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up hybrid vehicle 102 and its component parts, for example such as the computing component. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "machine-readable storage medium," "computer program medium," and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:
an operational component external to a cabin of the vehicle, wherein noise generated by the operational component increases with a duty level of the operational component; and
a computer processor reducing a level of the noise entering the vehicle through a window of the vehicle by setting the duty level of the operational component to less than a maximum duty level of the operational component, and the duty level of the operational component is based on:
a first duty map, wherein the first duty map reduces the duty level of the operational component based on a position of the window being in an open position, and
a second duty map, wherein the second duty map further reduces the duty level of the operational component based on detecting a presence of a sound-reflecting structure proximate to the vehicle with a sensor.

2. The vehicle of claim 1, wherein:
the operational component includes a rotating component;
the noise generated by the operational component increases with a speed of rotation of the rotating component; and
the computer processor is further configured to control the speed of rotation of the rotating component based on the position of the window of the vehicle and:
the presence of the sound-reflecting structure proximate to the vehicle.

3. The vehicle of claim 1,
wherein the first and second duty maps identify a percentage of the maximum duty level of the operational component;
wherein the computer processor is configured to set the duty level of the operational component according to the first and second duty map.

4. The vehicle of claim 1, wherein the operational component comprises at least one of:
an electric cooling fan;
an electric compressor;
an alternator;
a power steering pump; and
a water pump.

5. The vehicle of claim 1, wherein the computer processor stores a plurality of duty maps, wherein each of the duty maps comprises a separate percentage of the maximum duty level of the operational component based on the position of the window, or the presence of the sound-reflecting structure proximate to the vehicle.

6. A method for a vehicle, the method comprising:
a plurality of sensors detecting a position of a window of the vehicle; and
an electronic control unit (ECU) reducing a level of noise entering the vehicle through the window by setting a duty level of an operational component of the vehicle to less than a maximum duty level of the operational component, and the duty level of the operational component is based on:
a first duty map, wherein the first duty map reduces the duty level of the operational component based on the position of the window being in an open position, and
a second duty map, wherein the second duty map further reduces the duty level of the operational component based on detecting a presence of a sound-reflecting structure proximate to the vehicle with a sensor;
wherein the operational component is external to a cabin of the vehicle; and wherein noise generated by the operational component increases with the duty level of the operational component.

7. The method of claim 6, wherein:
the operational component includes a rotating component;
the noise generated by the operational component increases with a speed of rotation of the rotating component; and
setting the duty level of the operational component comprises setting a speed of rotation of the rotating component.

8. The method of claim 6, further comprising:
the plurality of sensors further detecting:
the presence of the sound-reflecting structure proximate to the vehicle.

9. The method of claim 6,
wherein the first and second duty maps identify a percentage of the maximum duty level of the operational component; and
wherein the ECU sets the duty level of the operational component according to the first and second duty map.

10. The method of claim 6, further comprising:
the ECU setting the duty level of the operational component responsive to the sound-reflecting structure being proximate to the vehicle.

11. The method of claim 6, wherein the operational component comprises at least one of:
an electric cooling fan;
an electric compressor;
an alternator;
a power steering pump; and
a water pump.

12. A non-transitory computer-readable storage medium encoded with instructions executable by a hardware processor of a computing component, the machine-readable storage medium comprising instructions to cause the hardware processor to perform a method for a vehicle, the method comprising:
determining a position of a window of the vehicle; and
reducing a level of noise entering through the window of the vehicle by setting the duty level of the operational component to less than a maximum duty level of the operational component, and the duty level of the operational component is based on:
a first duty map, wherein the first duty map reduces the duty level of the operational component based on the position of the window being in an open position, and
a second duty map, wherein the second duty map further reduces the duty level of the operational component based on detecting a presence of a sound-reflecting structure proximate to the vehicle with a sensor;
wherein the operational component is external to a cabin of the vehicle; and
wherein noise generated by the operational component increases with the duty level of the operational component.

13. The computer-readable storage medium of claim 12, wherein:
the operational component includes a rotating component;
the noise generated by the operational component increases with a speed of rotation of the rotating component; and
setting the duty level of an operational component comprises setting the speed of rotation of the rotating component.

14. The computer-readable storage medium of claim 12, wherein the method further comprises: detecting:
the position of the window,
and
the presence of the sound-reflecting structure proximate to the vehicle.

15. The computer-readable storage medium of claim 12, wherein the method further comprises:
setting the duty level of the operational component responsive to the window of the vehicle being open.

16. The computer-readable storage medium of claim 15, wherein the first and second duty maps identify a percentage of the maximum duty level of the operational component; and
wherein setting the duty level of the operational component is according to the first and second duty map.

17. The computer-readable storage medium of claim 15, wherein the method further comprises:
setting the duty level of the operational component responsive to the sound-reflecting structure being proximate to the vehicle.

* * * * *